United States Patent
Kaluve et al.

(10) Patent No.: US 7,177,946 B1
(45) Date of Patent: Feb. 13, 2007

(54) OPTIMAL SYNC FOR RAPID SPANNING TREE PROTOCOL

(75) Inventors: Shyamasundar S. Kaluve, Santa Clara, CA (US); Norman W. Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 853 days.

(21) Appl. No.: 10/012,006

(22) Filed: Dec. 6, 2001

(51) Int. Cl.
G06F 15/173 (2006.01)
H04L 12/28 (2006.01)

(52) U.S. Cl. ...................................... 709/242; 370/256
(58) Field of Classification Search ................ 709/230, 709/242; 370/256, 408
See application file for complete search history.

(56) References Cited

U.S. PATENT DOCUMENTS

| | | |
|---|---|---|
| 4,811,337 A | 3/1989 | Hart |
| 4,922,486 A | 5/1990 | Lidinksy et al. |
| 5,018,137 A | 5/1991 | Backes et al. |
| 5,138,615 A | 8/1992 | Lamport et al. |
| 5,150,360 A | 9/1992 | Perlman et al. |
| 5,280,480 A | 1/1994 | Pitt et al. |
| 5,323,394 A | 6/1994 | Perlman |
| 5,327,424 A | 7/1994 | Perlman |
| 5,398,242 A | 3/1995 | Perlman |
| 5,400,333 A | 3/1995 | Perlman |
| 5,606,669 A | 2/1997 | Bertin et al. |
| 5,740,171 A | 4/1998 | Mazzola et al. |
| 5,742,604 A | 4/1998 | Edsall et al. |
| 5,761,435 A | 6/1998 | Fukuda et al. |
| 5,764,636 A | 6/1998 | Edsall |
| 5,790,808 A | 8/1998 | Seaman |
| 5,844,902 A | 12/1998 | Perlman |
| 5,870,386 A | 2/1999 | Perlman et al. |
| 5,878,232 A | 3/1999 | Marimuthu |
| 5,959,968 A | 9/1999 | Chin et al. |
| 6,081,512 A | 6/2000 | Muller et al. |
| 6,202,114 B1 * | 3/2001 | Dutt et al. .................. 710/311 |

(Continued)

OTHER PUBLICATIONS

Horowitz, S., Dual-Layer Spanning Tree, A Spanning Tree Proposal for IEEE 802.1Q, May 14, 1997, pp. 45-48.

(Continued)

Primary Examiner—Bunjob Jaroenchonwanit
Assistant Examiner—Douglas Blair
(74) Attorney, Agent, or Firm—Cesari and McKenna LLP

(57) ABSTRACT

An optimization to the rapid spanning tree protocol (RSTP) is presented. An intermediate network device configured in accordance with the present invention preferably includes a plurality of ports for receiving and forwarding messages and a spanning tree protocol (STP) engine which is coupled to the ports. If the device receives a bridge protocol data unit (BPDU) message from a designated port of a neighboring intermediate network device and the BPDU represents a proposal by the neighboring device to rapidly transition its port to the forwarding state, the device first determines whether or not it is the root the bridged network. If the device is not the root, and the BPDU message was received on the device's existing root port or on its newly selected root port, the device preferably invokes an "optimal sync" mechanism. Specifically, the device transitions only its alternate root port(s) and the previous root port, if any, to the blocking state, while leaving all of its designated ports, if any, in the forwarding state. The device then returns an agreement BPDU message to the neighboring device.

13 Claims, 6 Drawing Sheets

U.S. PATENT DOCUMENTS

| | | | |
|---|---|---|---|
| 6,219,739 B1* | 4/2001 | Dutt et al. | 710/311 |
| 6,236,659 B1 | 5/2001 | Pascoe | |
| 6,262,977 B1* | 7/2001 | Seaman et al. | 370/256 |
| 6,330,229 B1* | 12/2001 | Jain et al. | 370/256 |
| 6,373,826 B1* | 4/2002 | Russell et al. | 370/256 |
| 6,535,490 B1* | 3/2003 | Jain | 370/256 |
| 6,560,236 B1 | 5/2003 | Varghese et al. | |
| 6,611,502 B1* | 8/2003 | Seaman | 370/256 |
| 6,771,610 B1* | 8/2004 | Seaman | 370/256 |
| 6,826,158 B2* | 11/2004 | Seaman et al. | 370/254 |
| 7,061,875 B1* | 6/2006 | Portolani et al. | 370/256 |
| 7,064,592 B2* | 6/2006 | Jiang | 327/161 |
| 2001/0021177 A1* | 9/2001 | Ishii | 370/256 |

OTHER PUBLICATIONS

Seaman, M. and Delaney, D., Single or Multiple Filtering Databases, May 8, 1997.

Lucent Technologies Inc.'s Initial Disclosure of Prior Art Under Civil Local Rule 16-7, Case No. C98-20836 JW (PVT) ENE.

IEEE Standard 802.1D, Draft Standard for Local Area Networks MAC (Media Access Control) Bridges: Technical and Editorial Corrections, Mar. 6, 1997, pp. 3-10 85-122 and 151-158.

Perlman, Radia, Interconnections: Bridges and Routers, (c) 1992, pp. 54-64.

Hart, John, Extending the IEEE 802.1 MAC Bridge Standard to Remote Bridges, IEE Netowrk, Jan. 1988, pp. 10-15, vol. 2, No. 1.

Bhandari, I. Ofek, Y, Bulent, Y., and Yung M., Fault-Tolerant Convergance Routing, IEEE, 1994, pp. 229-238.

Perlman, R., An Algorithm for Distributed Computation of Spanning Tree in an Extended LAN, ACM ISSN 0146-4833, 1985, pp. 44-53.

Cheng, C., A protocol to maintain a Minimum Spanning Tree in a Dynamic Topology, Cimet, I.A.; Kumar P.R., ACM 0-8979-279 9/88/088/0330, 1998, pp. 330-338.

Configuring and Monitoring Switch Node Software, Bay Networks, May 1997, pp. i-xi, and 4-1 to 4-8.

Release Notes for Catalyst 2820 Series and Catalyst 1900 Series Firmware Version 5.35, Cisco Systems, Inc., Aug. 15, 1997, pp. 1-8.

Catalyst 5000 Series Release Notes for Software Release 2.1(3), Cisco Systems, Inc., (c) 1997, pp. 1-6.

SK-NET Switch 6616 Ethernet/FDDI Switch Configuration Guide, SysKonnect, Inc., Mar. 1995, pp. i-vi and 1-37.

IEEE Standard for Local and metropolitan area networks—Common specifications, Part 3: Media Access Control (MAC) Bridges—Amendment 2: Rapid Reconfiguration, (co) 1997, pp. i-viii and 24-76.

* cited by examiner

OPTIMAL SYNC FOR RAPID SPANNING TREE PROTOCOL

BACKGROUND OF THE INVENTION

1. Field of the Invention

The present invention relates generally to computer networks, and more specifically, to a method and apparatus for quickly and efficiently resuming the forwarding of network messages despite network changes and failures.

2. Background Information

A computer network typically comprises a plurality of interconnected entities. An entity may consist of any device, such as a computer or end station, that "sources" (i.e., transmits) or "sinks" (i.e., receives) data frames. A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack). In many instances, several LANs may be interconnected by point-to-point links, microwave transceivers, satellite hook-ups, etc. to form a wide area network ("WAN") or intranet that may span an entire country or continent.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information between a plurality of LANs or end stations. Typically, the bridge or switch is a computer and includes a plurality of ports that couple the device to the LANs or end stations. The switching function includes receiving data from a sending entity at a source port and transferring that data to at least one destination port for forwarding to the receiving entity.

Switches and bridges typically learn which destination port to use in order to reach a particular entity by noting on which source port the last message originating from that entity was received. This information is then stored by the bridge in a block of memory referred to as a filtering database. Thereafter, when a message addressed to a given entity is received on a source port, the bridge looks up the entity in its filtering database and identifies the appropriate destination port to reach that entity. If no destination port is identified in the filtering database, the bridge floods the message out all ports, except the port on which the message was received. Messages addressed to broadcast or multicast addresses are also flooded.

Additionally, most computer networks are either partially or fully meshed. That is, they include redundant communications paths so that a failure of any given link or device does not isolate any portion of the network. The existence of redundant links, however, may cause the formation of circuitous paths or "loops" within the network. Loops are highly undesirable because data frames may traverse the loops indefinitely. Furthermore, because switches and bridges replicate (i.e., flood) frames whose destination port is unknown or which are directed to broadcast or multicast addresses, the existence of loops may cause a proliferation of data frames so large that the network becomes overwhelmed.

Spanning Tree Protocol

To avoid the formation of loops, most bridges and switches execute a spanning tree protocol which allows them to calculate an active network topology that is loop-free (i.e., a tree) and yet connects every pair of LANs within the network (i.e., the tree is spanning). The Institute of Electrical and Electronics Engineers (IEEE) has promulgated a standard (the 802.1D standard) that defines a spanning tree protocol to be executed by 802.1D compatible devices. In general, by executing the 802.1D spanning tree protocol, bridges elect a single bridge within the bridged network to be the "root" bridge. The 802.1D standard takes advantage of the fact that each bridge has a unique numerical identifier (bridge ID) by specifying that the root is the bridge with the lowest bridge ID. In addition, for each LAN coupled to more than one bridge, only one (the "designated bridge") is elected to forward frames to and from the respective LAN. The designated bridge is typically the one closest to the root. Each bridge also selects one port (its "root port") which gives the lowest cost path to the root. The root ports and designated bridge ports are selected for inclusion in the active topology and are placed in a forwarding state so that data frames may be forwarded to and from these ports and thus onto the corresponding paths or links of the network. Ports not included within the active topology are placed in a blocking state. When a port is in the blocking state, data frames will not be forwarded to or received from the port. A network administrator may also exclude a port from the spanning tree by placing it in a disabled state.

To obtain the information necessary to run the spanning tree protocol, bridges exchange special messages called configuration bridge protocol data unit (BPDU) messages. More specifically, upon start-up, each bridge initially assumes itself to be the root and transmits BPDU messages accordingly. Upon receipt of a BPDU message from a neighboring device, its contents are examined and compared with similar information (e.g., assumed root and lowest root path cost) stored by the receiving bridge in non-recoverable memory. If the information from the received BPDU is "better" than the stored information, the bridge adopts the better information and uses it in the BPDUs that it sends (adding the cost associated with the receiving port to the root path cost) from its ports, other than the port on which the "better" information was received. Although BPDU messages are not forwarded by bridges, the identifier of the root is eventually propagated to and adopted by all bridges as described above, allowing them to select their root port and any designated port(s).

In order to adapt the active topology to changes and failures, the root periodically (e.g., every hello time) transmits BPDU messages. The default hello time is 2 seconds. In response to receiving BPDUs on their root ports, bridges transmit their own BPDUs from their designated ports, if any. Thus, every two seconds BPDUs are propagated throughout the bridged network, confirming the active topology. That is, normally, each bridge replaces its stored BPDU information every hello time, thereby preventing it from being discarded and maintaining the current active topology. If a bridge stops receiving BPDU messages on a given port (indicating a possible link or device failure), it will continue to increment a respective message age value until it reaches the maximum age threshold. The bridge will then discard the stored BPDU information and proceed to recalculate the root, root path cost and root port by transmitting BPDU messages utilizing the next best information it has. The maximum age value used within the bridged network is typically set by the root, which enters the appropriate value in its BPDU messages.

As BPDU information is updated and/or timed-out and the active topology is recalculated, ports may transition from the blocking state to the forwarding state and vice versa. That is, as a result of new BPDU information, a previously blocked port may learn that it should be in the forwarding state (e.g., it is now the root port or a designated port). Rather than transition directly from the blocking state to the forwarding state, the 802.1D standard calls for ports to transition through two intermediate states: a listening state and a learning state. In the listening state, a port waits for information indicating that it is should return to the blocking state. If, by the end of a preset time, no such information is received, the port transitions to the learning state. In the learning state, a port still blocks the receiving and forwarding of frames, but received frames are examined and the corresponding location information is stored in the bridge's filtering database. At the end of a second preset time, the port transitions from the learning state to the forwarding state, thereby allowing frames to be forwarded to and from the port. The time spent in each of the listening and the learning states is referred to as the forwarding delay.

Although the spanning tree protocol provided in the 802.1D standard is able to maintain a loop-free topology despite network changes and failures, re-calculation of the active topology can be a time consuming and processor intensive task. For example, recalculation of the spanning tree following an intermediate device crash or failure can take approximately thirty seconds. During this time, message delivery is often delayed as ports transition between states. Such delays can have serious consequences on time-sensitive traffic flows, such as voice or video traffic streams.

Rapid Spanning Tree Protocol

Recently, the IEEE promulgated a new standard (the 802.1w standard) that defines a rapid spanning tree protocol (RSTP) to be executed by otherwise 802.1D compatible devices. The RSTP similarly selects one bridge of a bridged network to be the root bridge and defines an active topology that provides complete connectivity among the LANs while severing any loops. Each individual port of each bridge is assigned a port role according to whether the port is to be part of the active topology. The port roles defined by the 802.1w standard include Root, Designated, Alternate and Backup. The bridge port offering the best, e.g., lowest cost, path to the root is assigned the Root Port Role. Each bridge port offering an alternative, e.g., higher cost, path to the root is assigned the Alternate Port Role. Each bridge port providing the lowest cost path from a given LAN is assigned the Designated Port Role, while all other ports coupled to the given LAN in loop-back fashion are assigned the Backup Port Role.

Those ports that have been assigned the Root Port and Designated Port Roles are placed in the forwarding state, while ports assigned the Alternate and Backup Roles are placed in a discarding or blocking state. A port assigned the Root Port Role can be rapidly transitioned to the forwarding state provided that all of the ports assigned the Alternate Port Role are placed in the discarding or blocking state. Similarly, if a failure occurs on the port currently assigned the Root Port Role, a port assigned the Alternate Port Role can be reassigned to the Root Port Role and rapidly transitioned to the forwarding state, providing that the previous root port has been transitioned to the discarding or blocking state. A port assigned the Designated Port Role or a Backup Port that is to be reassigned to the Designated Port Role can be rapidly transitioned to the forwarding state, provided that the roles of the ports of the downstream bridge are consistent with this port being assigned the Designated Port Role. The RSTP provides an explicit handshake to be used by neighboring bridges to confirm that a new designated port can rapidly transition to the forwarding state.

Like the STP described in the 802.1D specification standard, bridges running RSTP also exchange BPDU messages in order to determine which roles to assign to the bridge's ports. The BPDU messages are also utilized in the handshake employed to rapidly transition designated ports to the forwarding state.

FIG. 1 is a block diagram of a RSTP BPDU message 100. The BPDU message 100 includes a BPDU message header 102 compatible with the Media Access Control (MAC) layer of the respective LAN standard. The message header 102 comprises a plurality of fields (not shown), such as a destination address (DA) field and a source address (SA) field. The DA field carries a unique bridge multicast destination address assigned to the spanning tree protocol. Appended to header 102 is a BPDU message area 104 that also contains a number of fields, including a protocol identifier (ID) field 106, a protocol version number field 108, a BPDU type field 110, a flags field 112, a root ID field 114, a root path cost field 116, a bridge ID field 118, a port ID field 120, a message age field 122, a maximum age field 124, a hello time field 126, and a forward delay field 128, among others. The root identifier field 114 typically contains the identifier of the bridge assumed to be the root and the bridge identifier field 118 contains the identifier of the bridge sourcing (i.e., sending) the BPDU 100. The root path cost field 116 contains a value representing the cost to reach the assumed root from the port on which the BPDU is sent and the port identifier field 120 contains the identifying number of the port from which the BPDU is sent.

As shown, the flags field 112 carries a plurality of single or multiple bit flags that may be set, e.g., asserted, or cleared, e.g., deasserted. Specifically, the flags field 112 includes a topology change flag 130, a proposal flag 132, a port role flag 134, a learning flag 136, a forwarding flag 138, an agreement flag 140 and a topology change acknowledgment (ACK) flag 142. The learning and forwarding flags 136 and 138 are set to reflect the current port state of the port from which the corresponding BPDU is being sent.

The handshake utilized by adjacent bridges for rapidly transitioning designated ports typically proceeds as follows. When an upstream bridge wishes to rapidly transition a designated port to the forwarding state, it issues a BPDU 100 from that port whose proposal flag 132 is asserted. The port role flag 134 is set to the value associated with the Designated Port Role. In the root ID and root path cost fields 114 and 116, the upstream bridge loads the corresponding information relative to the port from which the BPDU message 100 is to be sent. The upstream bridge then sends the BPDU message which is received at the neighboring downstream bridge.

Assuming the information contained in the BPDU message 100 is equal to or better than that currently stored by the port of the downstream bridge at which the BPDU is received, the downstream bridge asserts "sync" for all of its other bridge ports. Sync is a state machine variable defined by the 802.1w specification standard. Basically, this has the effect of causing the downstream bridge to transition all of its designated ports, other than "edge" ports, to the discarding state. An edge port is defined as a port which provides the only connection to a respective LAN, thereby representing an edge of the bridged network. Once the designated ports have been transitioned to the discarding state, the downstream bridge responds typically through its root port to the upstream bridge with a BPDU message 100 whose agreement flag 140 is asserted. This notifies the upstream bridge that the downstream bridge is in agreement with the respective port of the upstream bridge being transitioned to the forwarding state.

In addition, the designated port(s) of the downstream bridge request permission from their downstream bridges to rapidly transition back to the forwarding state following the same process. That is, BPDU messages 100 with their proposal flags 132 asserted are sent from these ports. In effect, a "cut" is made in the active topology at the first affected designated port and the cut propagates down from this first designated port through all bridges on the subtree below it, i.e., in a direction away from the root, until the cut reaches the edge of the bridged network.

SUMMARY OF THE INVENTION

Briefly, the present invention is directed to an optimization of the rapid spanning tree protocol (RSTP). An intermediate network device operating in accordance with the present invention preferably includes a plurality of ports for receiving and forwarding messages and a spanning tree protocol (STP) engine in communicating relationship with the ports. The STP engine includes a port role selection state machine for assigning RSTP roles to the ports and a port transition state machine for transitioning the ports among a plurality of RSTP states, including a discarding or blocking state, a learning state and a forwarding state. If the device receives a bridge protocol data unit (BPDU) message from a designated port of a neighboring intermediate network device and the BPDU message represents a proposal by the neighboring device to rapidly transition its port to the forwarding state, the device recalculates the roles and states of the ports based on the information contained in the received BPDU message. If the device was not previously the root, and does not become the root following the recalculation, then the device invokes the "optimal sync" mechanism of the present invention.

Specifically, if the proposal-BPDU message was received on the device's root port and that port remains the root port taking into account the information in the proposal-BPDU message, then the device confirms that its alternate ports are in the blocking state, and returns an agreement BPDU message to the neighboring device. Significantly, the device leaves all of its designated ports, if any, in the forwarding state. If the proposal-BPDU message was received on a non-root port which becomes the root port as a result of the information contained in the proposal-BPDU message, then the device transitions only the previous root port to the blocking or discarding state, and returns an agreement BPDU message to the neighboring device, while again leaving all of its designated ports, if any, in the forwarding state. Because the device has left its designated ports in the forwarding state, as part of the optimal sync mechanism, it need not issue proposal-BPDUs of its own in order to reactivate these ports.

BRIEF DESCRIPTION OF THE DRAWINGS

The invention description below refers to the accompanying drawings, of which.

DETAILED DESCRIPTION OF AN ILLUSTRATIVE EMBODIMENT

Figure 2:
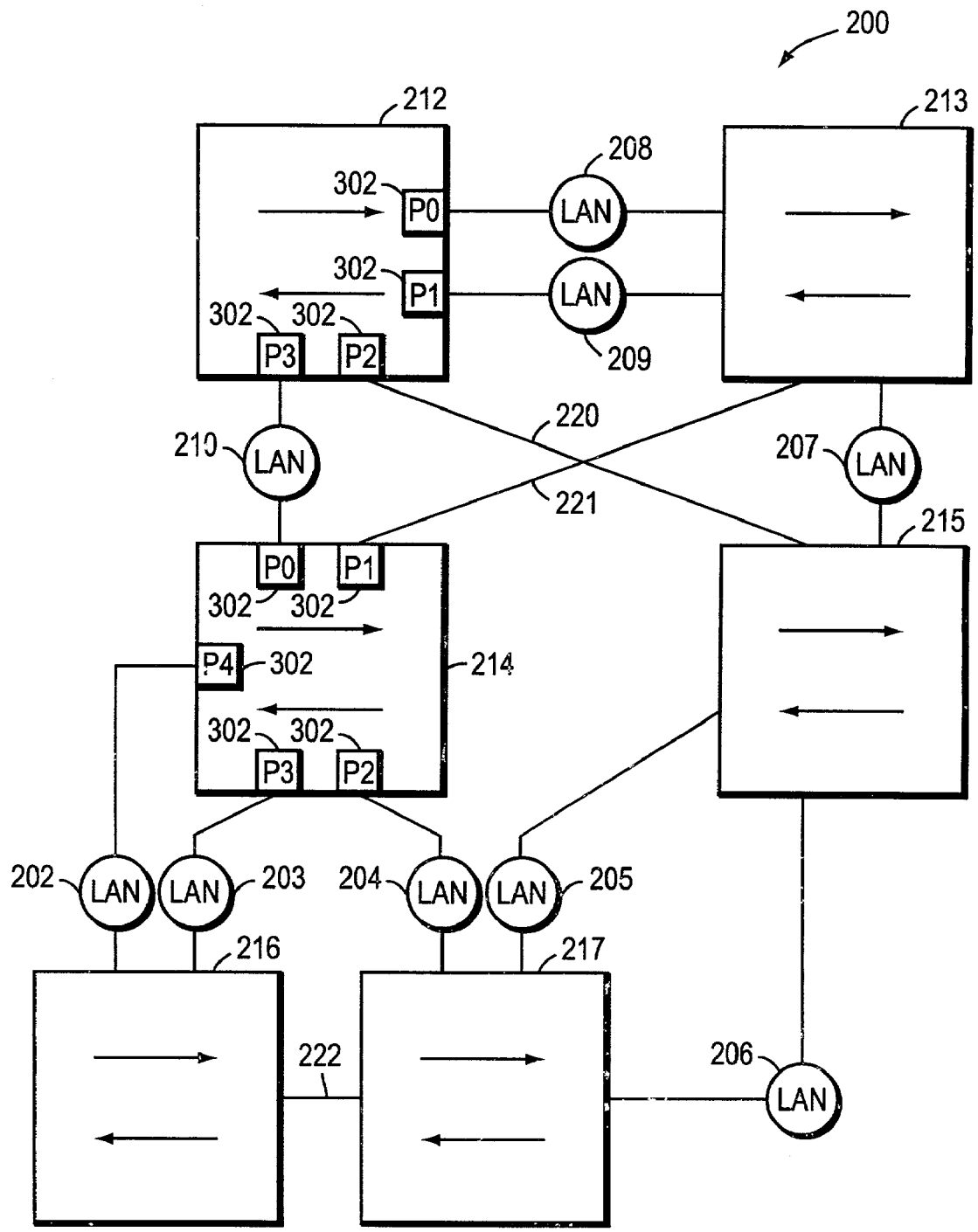
FIG. 2 is a highly schematic representation of a computer network.

FIG. 2 illustrates a partially meshed bridged network 200 in accordance with the present invention. The network 200 preferably comprises a plurality of local area networks (LANs) 202–210 that are interconnected by a plurality of intermediate devices, such as switches 212–217. One or more entities or hosts (not shown) are preferably coupled to each LAN 202–210 so that the entities may source or sink data frames to one another over the network 200. Each switch 212–210, moreover, preferably includes a plurality of ports 302 such that each LAN 202–210 is coupled to at least one port of switches 212–217.

At least some of the switches 212–217 may be interconnected by a series of links, such as point-to-point links 220–222, rather than by the LANs. Links 220–222 similarly carry messages, such as data frames, between respective switches. Each switch 212–217, moreover, preferably identifies its own ports 302, e.g., by port numbers, such as zero, one, two, three, etc. Switches 212–217 are thus able to associate specific ports with the LANs and/or switches coupled thereto.

It should be understood that the network 200 of FIG. 2 is meant for illustrative purposes only and that the present invention will operate with other networks having possibly far more complex topologies.

As shown, network 200 includes redundant links interconnecting switches 212–217. For example, switch 212 is connected to switch 215 along at least two different paths; first, via switch 213 alone and second, via switches 214 and 217. The existence of such redundant links prevents portions of the network 200 from becoming isolated should any constituent link or device fail. Such redundancy, however, also results in the creation of loops, which, as described above, are highly undesirable.

Execution of a spanning tree protocol prevents loops by defining a loop-free network topology (i.e., an active topology). Furthermore, execution of the Rapid Spanning Tree Protocol (RSTP) will allow the ports of the switches 212–217 that are part of the active topology to transition rapidly to a forwarding state so that network messages can be forwarded with minimal disruption and/or delay. However, as set forth above, in some situations, the current implementation of the RSTP may result in certain operating inefficiencies. To avoid these inefficiencies, among other reasons, at least some of the intermediate network devices (e.g., the switches, bridges, etc.) of network 200 execute an "optimal sync mechanism" in accordance with the present invention.

Figure 3:
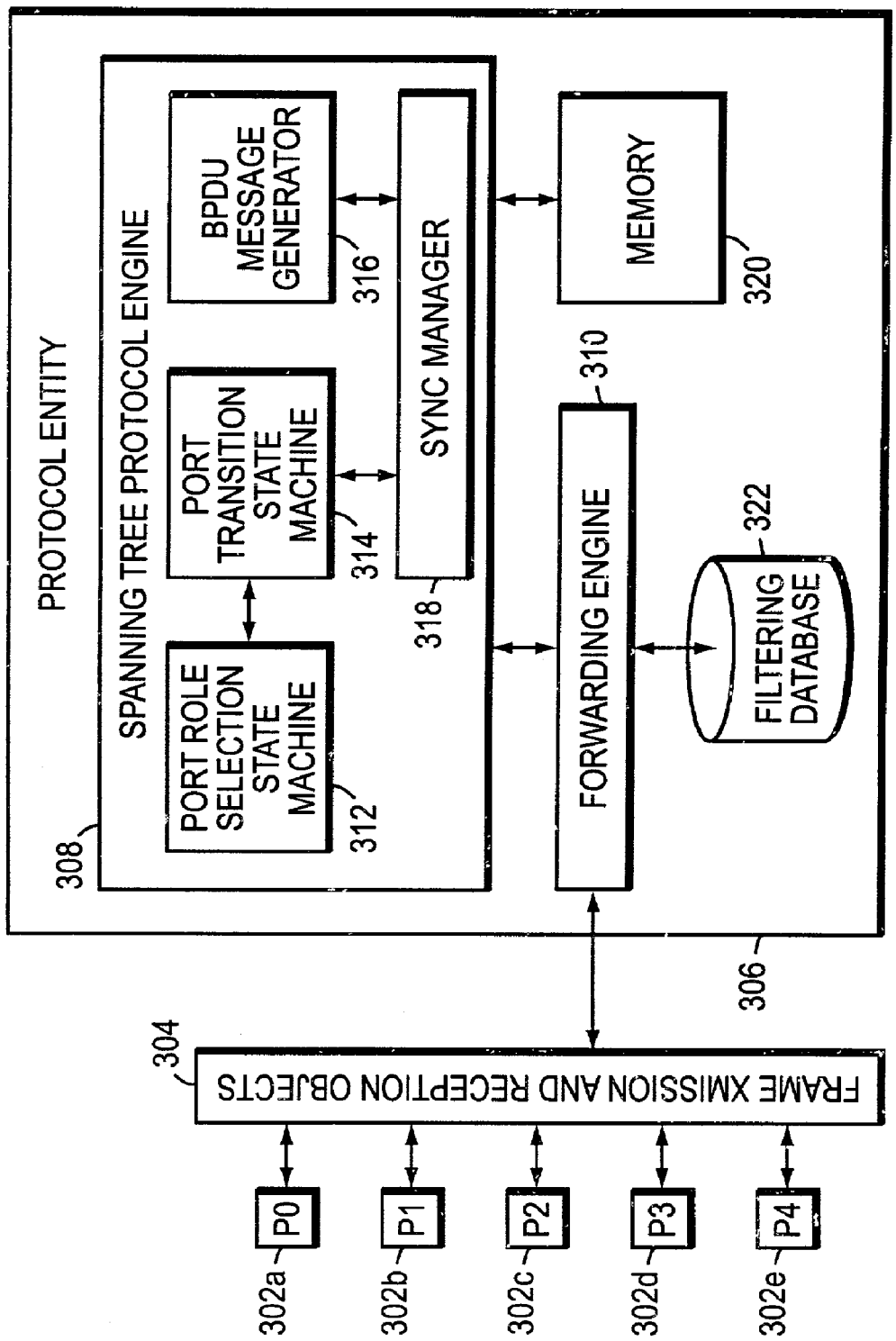
FIG. 3 is a highly schematic, partial block diagram of an intermediate network device in accordance with the present invention.

FIG. 3 is a partial block diagram of switch 214. Switch 214 includes a plurality of ports 302a–302e each of which is preferably identified by a number (e.g., P0–P4). One or more frame transmission and reception objects, designated generally 304, are associated with the ports 302a–e such that network messages, including data frames, received at a given port, e.g., P3, may be captured, and frames to be transmitted by switch 214 may be delivered to a given port, e.g., P1. Frame reception and transmission objects 304 are preferably message storage structures, such as priority queues. In the illustrated embodiment, switch 214 includes transmitting and receiving circuitry, including one or more line cards and/or network interface cards (NICs) establishing ports for the exchange of network messages, one or more central processing units (CPUs) and/or microprocessors and associated memory devices for performing calculations and one or more bus structures.

Switch 214 further includes at least one protocol entity 306 comprising a plurality of components. In particular, the protocol entity 306 includes at least one spanning tree protocol (STP) engine 308 and at least one forwarding engine 310. The STP engine 308 preferably comprises a plurality of subcomponents, including a port role selection state machine 312, a port transition state machine 314, a bridge protocol data unit (BPDU) message generator 316 and a sync manager 318. Except as described herein, the STP engine 308 preferably operates substantially in compliance with the IEEE 802.1w Rapid Spanning Tree Protocol (RSTP) supplement to the 802.1D specification standard, which is hereby incorporated by reference in its entirety. The STP engine 308 includes or is in communicating relationship with a memory 320, which may be a volatile or non-volatile random access memory (RAM) or some other memory device. Memory 320 is preferably organized to include a plurality of records or cells (not shown) for storing spanning tree related information or parameters, such as the switch's numeric bridge identifier (ID), the assigned path cost for each port 302*a–e*, the current or "best" spanning tree information for each port P0–P4, etc.

The forwarding engine 310 is in communicating relationship with the frame transmission and reception objects 304 and is coupled to at least one filtering database 322 that stores address information corresponding to the entities of network 200 (FIG. 2). Specifically, filtering database 322 has a plurality of records (not shown) each containing a plurality of cells, including a destination address cell, a destination port cell and a corresponding timer cell. Each record in the filtering database 322 preferably corresponds to a particular network entity.

The forwarding engine 310 is configured to switch or bridge network messages, such as packets and/or frames, from a source port 302 to one or more destinations ports 302 depending on information contained in the forwarding database 322 and also on the spanning tree port states of the respective ports 302 as managed by STP engine 308. The forwarding engine 312 is also in communicating relationship with the STP engine 308 and relays RSTP-related messages received at ports 302 thereto.

It will be understood by those skilled in the art that STP engine 308 and forwarding engine 310 may each comprise registers and combinational logic configured and arranged to produce sequential logic circuits. In the illustrated embodiment, engines 308 and 310 are preferably software modules or libraries containing program instructions pertaining to the methods described herein and executable by one or more processing elements (not shown) of switch 214. Other computer readable media may also be used to store and execute these program instructions. Nonetheless, those skilled in the art will recognize that various combinations of software and hardware, including firmware, may be utilized to implement the present invention.

Suitable intermediate network device platforms for use with the present invention include, but are not limited to, the commercially available Catalyst 4000 and 6000 series of switches from Cisco Systems, Inc. of San Jose, Calif.

Execution of the RSTP by the switches 212–217 (FIG. 2) of the bridged network 200 results in the convergence to an active topology with one device, e.g., switch 212, being elected the root. Suppose that port P1 of switch 214 is assigned the Root Port Role and is transitioned to the forwarding state, and that port P0 is assigned the Alternate Port Role as it represents an alternate path to root 212. Port P0 is transitioned to the blocking or discarding state. The terms blocking and discarding are used interchangeably herein. In addition, suppose that ports P2–P4 of switch 214 are assigned the Designated Port Role and that each port is transitioned to the forwarding state.

Figure 4A:
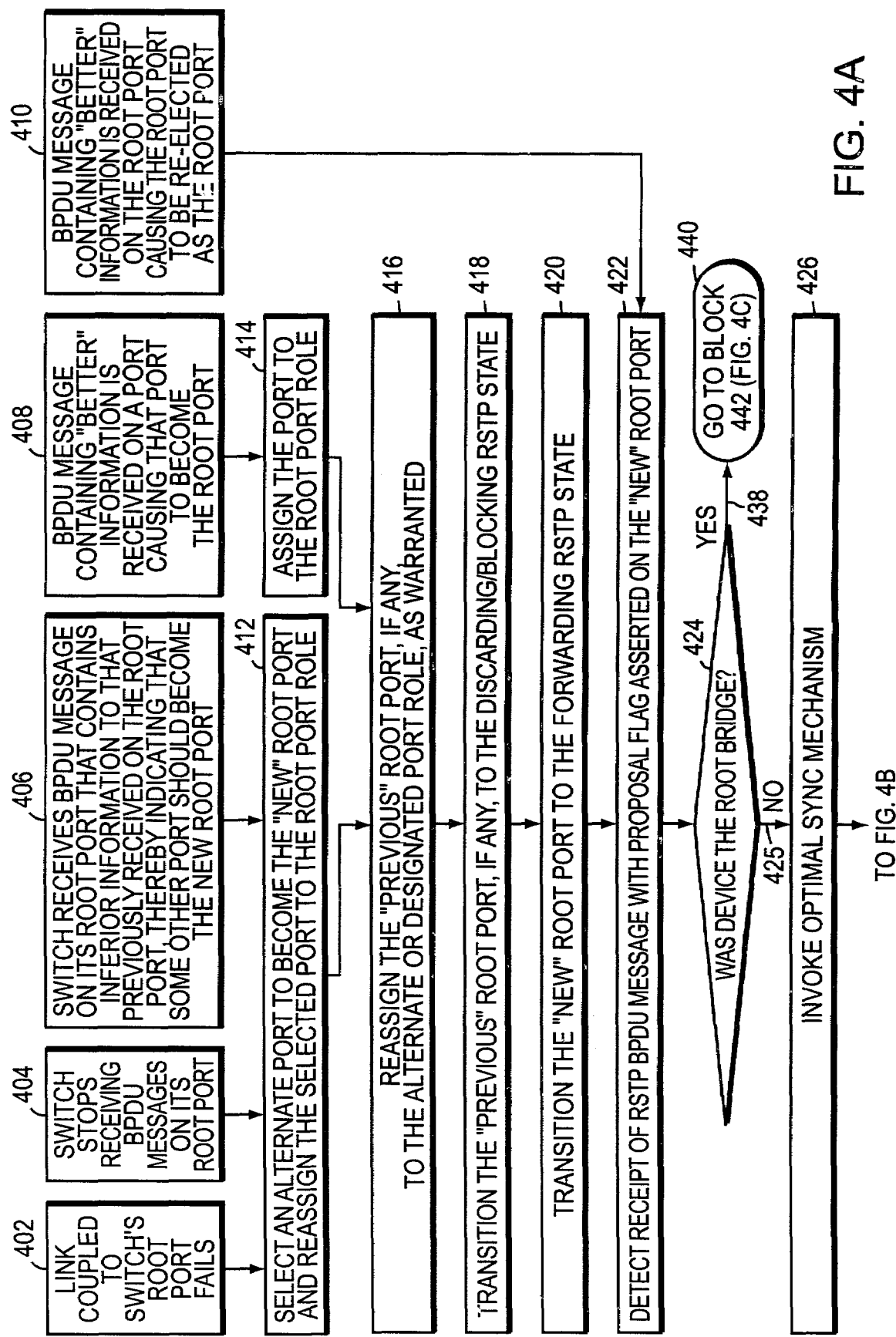
FIGS. 4A–C is a flow diagram of a preferred method of the present invention.
Figure 4B:
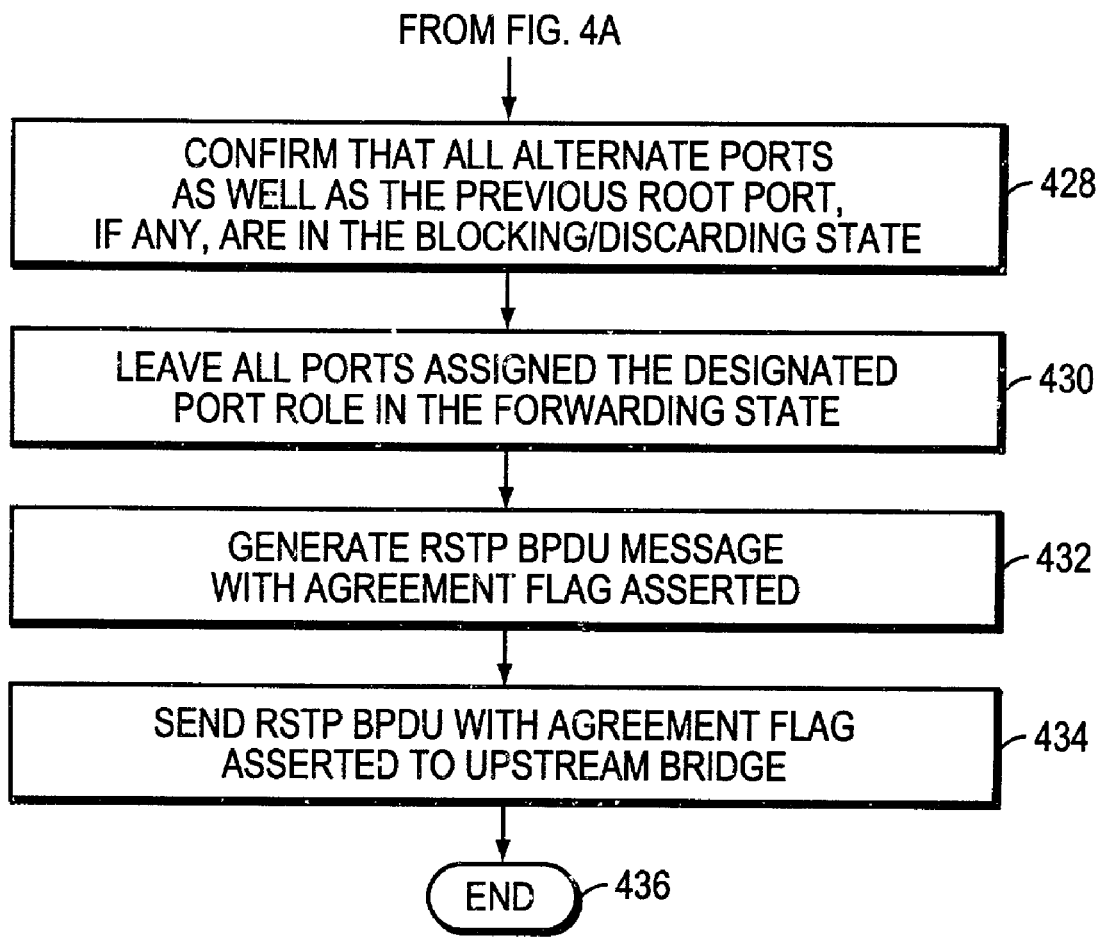
Figure 4C:
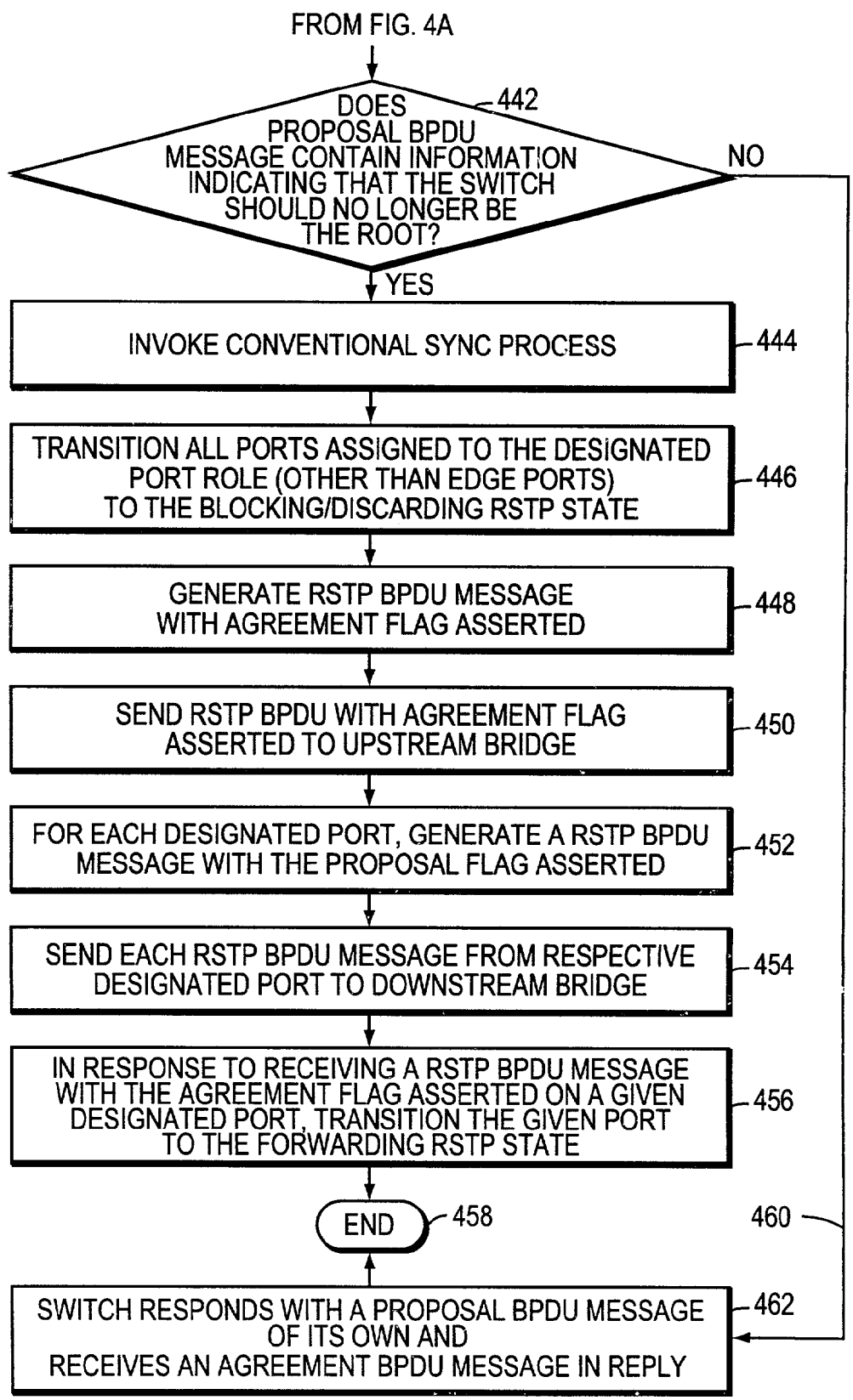

FIGS. 4A–C are a flow diagram of a preferred embodiment of the method of the present invention. The optimal sync mechanism of the present invention is invoked in response to receiving a BPDU message 100 whose proposal flag 132 is asserted on the current or newly elected root port. This may occur in response to a number of different situations as reflected in FIG. 4A. First, the link 221 coupled to the current root port, port P1, of switch 214 may fail, as indicated at block 402 (FIG. 4A). Alternatively, switch 214 may stop receiving BPDU messages 100 on its root port, as indicated at block 404. Switch 214 may also receive a BPDU message 100 on its root port, port P1, containing "inferior" information (e.g., root ID, root path cost, etc.) to that received on some other port of switch 214, suggesting that the other port should be the root port, as indicated at block 406. Conversely, a device, such as switch 214, which may or may not be the root of the respective bridged network, may receive a BPDU message 100 that contains "better" information than that previously received on and/or stored for the port on which the BPDU message was received, as indicated at block 408. Also, switch 214 may receive a BPDU message 100 on its root port that contains even "better" information than that previously received on the root port, thereby causing the root port to remain the root port, as indicated by block 410.

It should be understood that these situations may be caused by the addition, removal, failure or recovery of network components such as links, switches, etc. and/or the modification of BPDU-related information, such as bridge IDs, path costs, etc., at one or more devices, among other reasons.

In response to the situations represented by blocks 402, 404 and 406, the port role selection state machine 312 selects an alternate port, e.g., port P0, to become the new root port for switch 214, and reassigns this port to the Root Port Role, as indicated at block 412. In response to the situation of block 408, the port role selection machine 312 selects the port on which the "better" BPDU message 100 was received to become the new root port, and reassigns this port to the Root Port Role, as indicated at block 414. The port role selection state machine 312 also reassigns the previous root port, if any, to a new role, such as the Alternate Port Role or the Designated Port Role, as indicated at block 416. Upon reassigning the affected ports to their new roles, the port role selection state machine 312 then directs the port transition state machine 314 to transition the RSTP states of those ports in accordance with their new roles. Specifically, the port transition state machine 314 transitions the previous root port, e.g., port P1, if any, to the blocking state, as indicated at block 418. Next, state machine 314 transitions the newly selected root port, e.g., port P0, to the forwarding state, as indicated at block 420.

Figure 1:
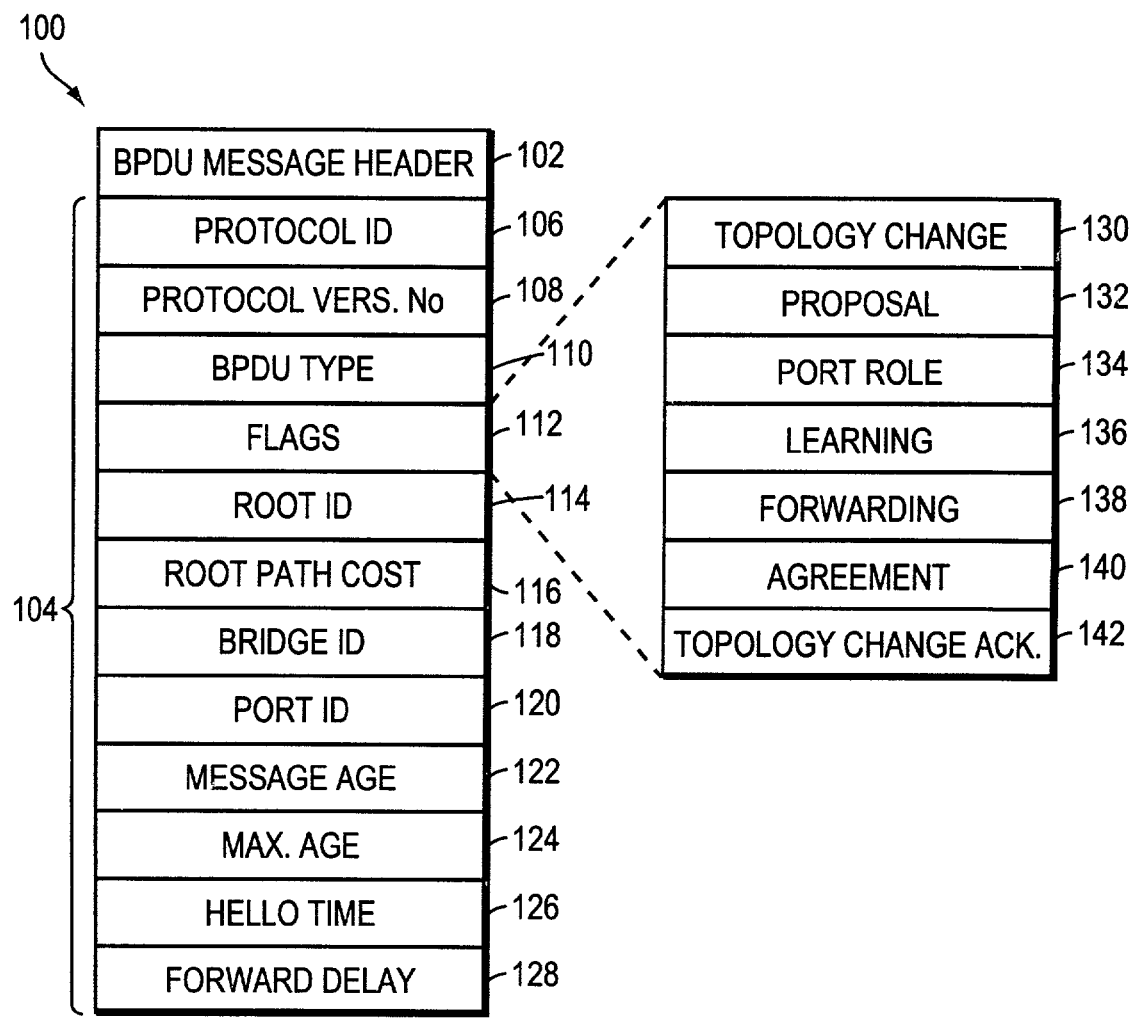
FIG. 1, previously discussed, is a block diagram of a conventional bridge protocol data unit (BPDU) message.

At some point, switch 214 may also receive a RSTP BPDU message 100 (FIG. 1) from switch 212 on its newly selected root port, e.g., port P0, or on its re-confirmed root port, e.g., port P1, as indicated at block 422. This RSTP BPDU message 100 is likely to have the proposal flag 132 asserted, thereby indicating that neighboring switch 212 wishes to transition its peer port, i.e., port P3 of switch 212, rapidly to forwarding. The BPDU message 100 is passed to the spanning tree protocol engine 308 of switch 214 for processing. Engine 308 preferably determines whether it, i.e., switch 214, was the root of the bridged network 200, as indicated at decision block 424. If it was not just the root, engine 308 invokes the optimal sync mechanism of the present invention, as indicated by No arrow 425 leading to block 426.

Specifically, the sync manager 318 in cooperation with the port transition state machine engine 314 confirms that all alternate ports, as well as the previous root port, e.g., port P1, if any, are in the blocking state, as indicated at block 428 (FIG. 4B). If the previous root port is not in the blocking state, the state machine 314 may transition it to the blocking state at this time. In the example, the only alternate port is the previous root port, e.g., port P1, and it is already in the blocking state. Next, the sync manager 318 directs the port transition state machine engine 314 to leave any designated ports at switch 214, e.g., ports P2–P4, in the forwarding state, as indicated at block 430. That is, in response to the proposal-BPDU message, the sync manager 318 does not cause the switch's designated ports to be transitioned to the blocking state.

The sync manager 318 then directs the BPDU message generator 316 to generate a BPDU message 100 (FIG. 1) for responding to neighboring switch 212, as indicated at block 432. The agreement flag 140 of this BPDU message 100 is asserted, as also indicated at block 432. The spanning tree protocol engine 308 causes this BPDU message with the agreement flag 140 asserted to be sent from port P0 to neighboring switch 212, as indicated at block 434, thereby notifying switch 212 that it may transition its peer port, i.e., port P3, rapidly to forwarding. At this point, processing pursuant to the optimal sync mechanism of the present invention is complete, as indicated by end block 436.

It should be understood that the proposal-BPDU message 100 identified in block 422 (FIG. 4A) might be received at any point in the process, even prior to the conditions corresponding to blocks 402–410.

It should be further understood that once the optimal sync process is complete, e.g., after the agreement BPDU message 100 has been returned to the neighboring device 212, the port transition state machine 314 can transition the previous root port, e.g., port P1, at switch 214 through the learning state to the forwarding state, if, as part of the transition to the new root port, the previous root port was assigned to the Designated Port Role.

The optimal sync mechanism of the present invention takes advantage of a condition identified by the inventors for making RSTP more efficient. Specifically, where the affected bridge is not the root of the bridged network and the proposal-BPDU is received on the bridge's existing or newly elected root port, then the only port of the affected bridge that could create a loop in the bridged network is the previous root port or alternate root port(s), if any. Provided that the previous root port and/or all alternate root port(s) are placed or remain in the blocking state, then transitioning the bridge's designated ports to the blocking states (as required under the RSTP specification standard) is unnecessary. Accordingly, with the optimal sync mechanism of the present invention, if the above described conditions are met, i.e., the bridge is not the root, the proposal-BPDU is or had been received on the bridge's root port, and the bridge's previous root port, if any, and all alternate root ports are in the blocking state, then the bridge can leave its designated ports in the forwarding state and still respond to the upstream bridge with an agreement-BPDU without risking the creation of a loop within the bridged network.

Returning to decision block 424 (FIG. 4A), if the bridge receiving the BPDU message 100 with its proposal flag 132 asserted was the root prior to processing the BPDU message, then processing moves via Yes arrow 438 and jump block 440 to decision block 442 (FIG. 4C). Here, the STP engine 308 determines whether the received BPDU message contains better root information, i.e., engine 308 determines whether the received BPDU message indicates that the switch should no longer consider itself the root of bridged network 200. If it does, the conventional sync mechanism is preferably invoked, as indicated by block 444. In this case, the sync manager 318 directs the port transition state machine 314 to transition all designated ports other than edge ports, e.g., ports P2–P4, to the blocking state, as indicated at block 446. The sync manager 318 then directs the BPDU message generator 316 to generate a BPDU message 100 (FIG. 1) for responding to the neighboring switch with its agreement flag 140 asserted, as indicated at block 448. The spanning tree protocol engine 308 causes this agreement-BPDU message 100 to be sent to neighboring switch 212, as indicated at block 450, thereby notifying switch 212 that it may go ahead and transition its peer port to the forwarding state.

Switch 214 also needs to return its own designated ports to the forwarding state. Accordingly, for each non-edge port, e.g., ports P2–P4, that is assigned to the Designated Port Role, the BPDU message generator 316 formulates a BPDU message 100 (FIG. 1) with the proposal flag 132 asserted, as indicated at block 452. These BPDU messages 100 are sent from the respective designated ports to the downstream bridges, e.g., to switches 216 and 217, as indicated at block 454. Assuming the received BPDU messages contain better (or the same) information than that stored by the switches 216 and 217, they respond to switch 214 with BPDU messages 100 in which the agreement flag 140 is asserted. In response to receiving such a BPDU message 100, switch 214 rapidly transitions the respective designated port to the forwarding state, as indicated at block 456. Processing is then complete as indicated by end block 458.

It should be understood that proposal BPDU messages may be sent from the designated ports before the agreement BPDU message is sent.

If the STP engine 308 determines at decision block 442 that the received proposal-BPDU message contains information indicating that the switch is still the root of the bridged network 200, then processing proceeds via No arrow 460 to block 462. In this case, the switch responds with a proposal-BPDU of its own, and receives an agreement-BPDU message from the neighboring switch. Processing is then complete as also indicated by end block 458.

As shown, use of the present invention prevents the rippling effect of designated ports being transitioned to blocking only to be subsequently re-transitioned back to forwarding. Operation of the conventional RSTP causes such back-and-forth transitioning to occur at each bridge from the point at which the topology is changed out to the leaves of the active topology.

It should be understood that, for a root bridge, processing may begin with block 422 (FIG. 4A).

If a proposal-BPDU is received on a port that is not the current root port and the proposal-BPDU does not cause the port on which it was received to become the new root port, e.g., the proposal-BPDU is received on an alternate port, a designated port or a backup port, then it is processed in a conventional manner as provided by the RSTP specification standard.

As indicated above, switch 214 may include a plurality of line cards (not shown) comprising the ports 302 established at the switch 214. Switch 214 may also include one or more supervisor cards that contain circuitry configured to perform switching and other functions. The line cards and supervisor card may communicate with each other via one or more bus structures. It should be understood that the spanning tree protocol engine 308 may be disposed entirely on the supervisor card, referred to as a centralized architecture, or it may be distributed across the line cards, referred to as a distributed architecture. Alternatively, the spanning tree protocol engine may be distributed across two or more supervisor cards or across various combinations of supervisor cards and line cards.

Multiple Spanning Tree Instances

Those skilled in the art understand that the bridged network 200 may be segregated into a series of logical network segments. U.S. Pat. No. 5,394,402, issued Feb. 28, 1995 (the "'402 patent"), for example, discloses an arrangement for associating any port of a switch with any particular segregated network group. Specifically, according to the '402 patent, any number of physical ports of a particular switch may be associated with any number of groups within the switch by using a virtual local area network (VLAN) arrangement that virtually associates the port with a particular VLAN designation. These VLAN designations are also associated with the messages that are received on these ports. In particular, every time a message is received on one of these ports, the VLAN designation for that port, as stored in a memory portion of the bridge, is associated with the message. For convenience, each VLAN designation is often associated with a different color, such as red, blue, green, etc.

In addition to the '402 patent, the IEEE has promulgated the 802.1Q specification standard for Virtual Bridged Local Area Networks. The IEEE's 802.1Q standard supports VLANs and defines a specific VLAN-tagged message format for transmission on trunks.

With the development of VLANs, several "solutions" have been developed for overlaying spanning trees on these virtually segregated network groups. The IEEE 802.1Q standards committee, for example, has proposed defining a single spanning tree for all VLAN designations in the computer network. Thus, either all VLAN tagged frames may be forwarded and received through a given port or none may be. An alternative to the 802.1Q single spanning tree approach is to define a separate spanning tree for each VLAN designation within the network. This alternative is currently being implemented by certain networking equipment from Cisco Systems, Inc., as described in the *Cisco IOS VLAN Services* document. With this approach, BPDUs are preferably tagged with each of the VLAN designations defined within the bridged network. Upon receipt, these tagged BPDUs are then processed by the switches so as to define a separate spanning tree or active topology for each VLAN designation within the bridged network. Thus, for a given port, messages associated with one VLAN designation, e.g., blue, may be forwarded and received while messages associated with a second VLAN designation, e.g., green, may be blocked.

Rather than providing a separate active topology for each VLAN designation within the bridged network 100, it is also possible to define more than one active topology but some number less than the total number of VLAN designations. The Institute of Electrical and Electronics Engineers (IEEE), for example, is working on a Multiple Spanning Trees (MST) protocol, which is identified as the 802.1s supplement (Draft 10, Jun. 16, 2001) to supplement the 802.1Q specification standard, both of which are hereby incorporated by reference in their entirety. In addition to the 802.1s draft supplement, U.S. Pat. No. 6,188,694, titled Shared Spanning Tree Protocol to Michael Fine et al., describes a system in which a plurality of spanning trees are defined and shared by a number of VLAN designations.

A switch, such as switch 214, running a multiple spanning tree protocol may utilize the optimal sync mechanism of the present invention for one or more of the active topologies or spanning tree instances being implement by the switch 214. That is, if the switch 214 receives a proposal BPDU message on a port that is the root port for any active topology or spanning tree instance, and the other conditions described above are satisfied, the switch preferably invokes the optimal sync mechanism of the present invention.

The foregoing description has been directed to specific embodiments of this invention. It will be apparent, however, that other variations and modifications may be made to the described embodiments, with the attainment of some or all of their advantages. Therefore, it is an object of the appended claims to cover all such variations and modifications as come within the true spirit and scope of the invention.

What is claimed is:

1. In an intermediate network device having a plurality of ports for forwarding network messages within a bridged network, a method for efficiently transitioning the ports among a plurality of spanning tree protocol (STP) states, the method comprising the steps of:

executing the STP at the intermediate network device so as to elect a root of the bridged network and to assign one of the device's ports to a Root Port Role, one or more of the device's ports to an Alternate Port Role, and one or more of the device's ports to a Designated Port Role;

transitioning the ports assigned to the Root Port Role and the Designated Port Role to a forwarding STP state;

transitioning the one or more ports assigned to the Alternate Port Role to a discarding STP state;

receiving a bridge protocol data unit (BPDU) message, the BPDU message having a proposal flag that is asserted; and if the BPDU message was received on the port assigned the Root Port Role, leaving the one or more ports assigned to the Designated Port Role in the forwarding STP state, provided that the one or more ports assigned to the Alternate Port Role are in the discarding STP state.

2. The method of claim 1 wherein the STP substantially complies with the Institute of Electrical and Electronics Engineers (IEEE) 802.1w Rapid Spanning Tree Protocol (RSTP) specification standard.

3. The method of claim 1 wherein, in response to receiving the BPDU message with the proposal flag asserted, the device does not issue one or more BPDU messages from its ports assigned to the Designated Port Role.

4. The method of claim 3 further comprising the step of issuing a BPDU message from the port assigned to the Root Port Role, the issued BPDU message having an agreement flag that is asserted.

5. The method of claim 1 further comprising the steps of:

transitioning one or more ports assigned to the Designated Port Role to a discarding STP state, if the BPDU message with the asserted proposal flag is received on a port other than the port assigned to the Root Port Role; and upon transitioning the one or more ports assigned to the Designated Port Role to the discarding state, issuing a BPDU message from the port on which the BPDU message with the asserted proposal flag was received, the issued BPDU message having an agreement flag that is asserted.

6. The method of claim 1 further comprising the step of, if the one or more ports assigned the Alternate Port Role is not in the discarding STP state, placing such ports in the discarding STP state.

7. An intermediate network device configured to forward network messages within a bridged network, the device having a plurality of ports for connecting the device to one or more network entities, the intermediate network device comprising:
- a port role selection state machine configured to assign roles to the ports;
- a port transition state machine configured to transition the ports among a plurality of spanning tree protocol (STP) states depending on the assigned roles; and
- a sync manager for use in executing the STP, wherein,
  - the port role selection state machine and the port transition state machine cooperate so as to assign one of the device's ports to a Root Port Role, to assign one or more of the device's ports to an Alternate Port Role, and to assign one or more of the device's ports to a Designated Port Role,
  - the port role selection state machine and the port transition state machine further cooperating to transition the ports assigned to the Root Port Role and the Designated Port Role to a forwarding STP state and to transition the one or more ports assigned to the Alternate port role to a discarding STP state, and
  - in response to receiving a bridge protocol data unit (BPDU) message having a proposal flag that is asserted, the sync manager cooperates with the port transition state machine to leave one or more of the ports assigned to the Designated Port Role in the forwarding STP state, provided that the BPDU message was received on the port assigned the Root Port Role and further provided that the one or more ports assigned to the Alternate Port Role are in a discarding STP state.

8. The intermediate network device of claim 7 further comprising a forwarding engine configured to forward network messages received on a first port to one or more second ports.

9. The intermediate network device of claim 7 wherein the STP executed by the device substantially complies with the Institute of Electrical and Electronics Engineers (IEEE) 802.1w Rapid Spanning Tree Protocol (RSTP) specification standard.

10. The intermediate network device of claim 7 further comprising a BPDU message generator, wherein the sync manager cooperates with the BPDU message generator to have a BPDU message issued from the port assigned to the Root Port Role, the issued BPDU message having an agreement flag that is asserted.

11. In an intermediate network device having a plurality of ports for forwarding network messages within a bridged network, a method for efficiently transitioning the ports among a plurality of spanning tree protocol (STP) states, the method comprising the steps of:
- executing the STP at the intermediate network device so as to elect a root of the bridged network, to designate a port of the device to be the current root port and to assign one or more of the device's ports to a Designated Port Role;
- transitioning the ports assigned to the Designated Port Role to a forwarding STP state;
- receiving a bridge protocol data unit (BPDU) message, the BPDU message having a proposal flag that is asserted; and
- if the proposal-BPDU message was received on the current root port, leaving the one or more ports assigned to the Designated Port Role in the forwarding STP state.

12. The method of claim 11 further comprising the step of, if the proposal-BPDU message was received on a newly elected root port, identifying the current root port as a previous root port, transitioning the previous root port to a blocking STP state and leaving the one or more ports assigned to the Designated Port Role in the forwarding STP state.

13. The method of claim 12 further comprising the step of issuing a BPDU message from the port on which the proposal-BPDU message was received, the issued BPDU message having an agreement flag that is asserted.

* * * * *